United States Patent Office 3,365,155
Patented Jan. 23, 1968

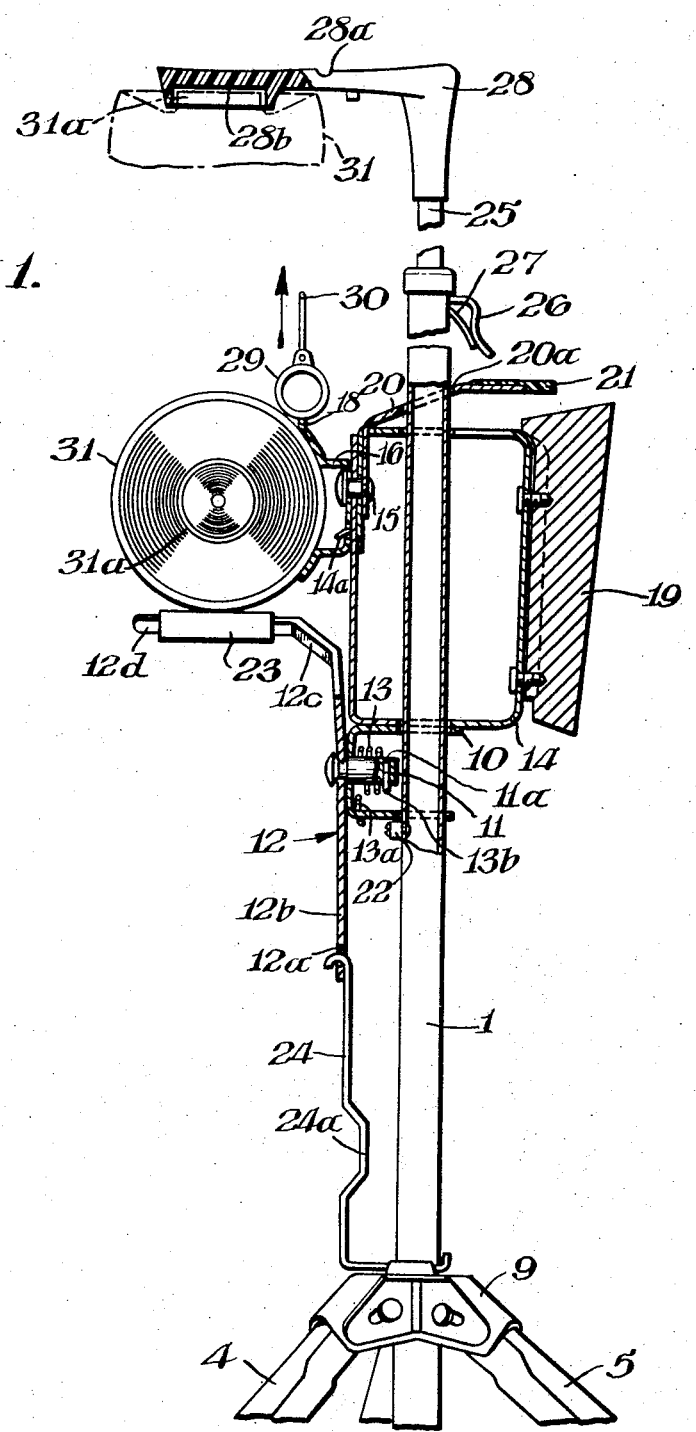

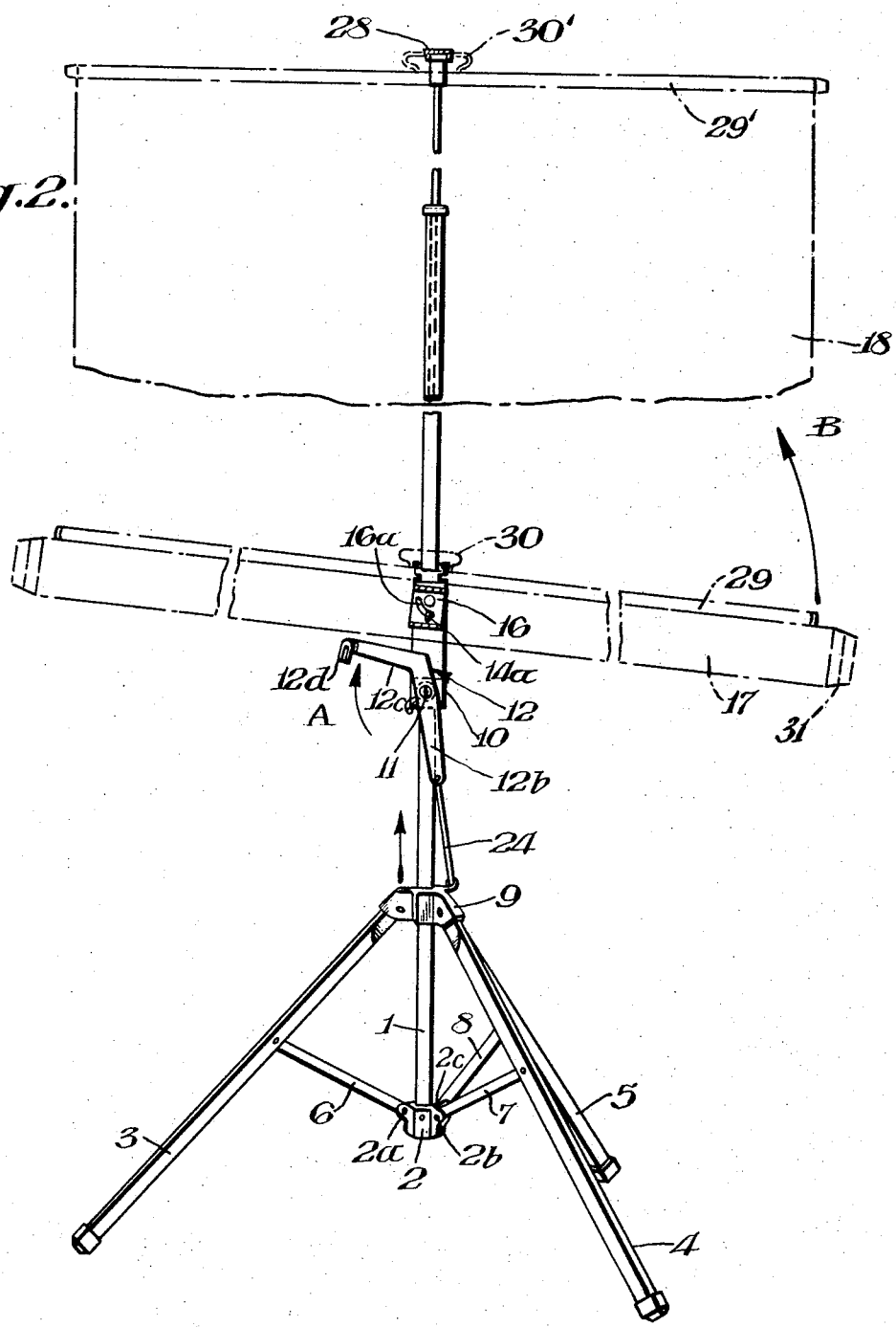

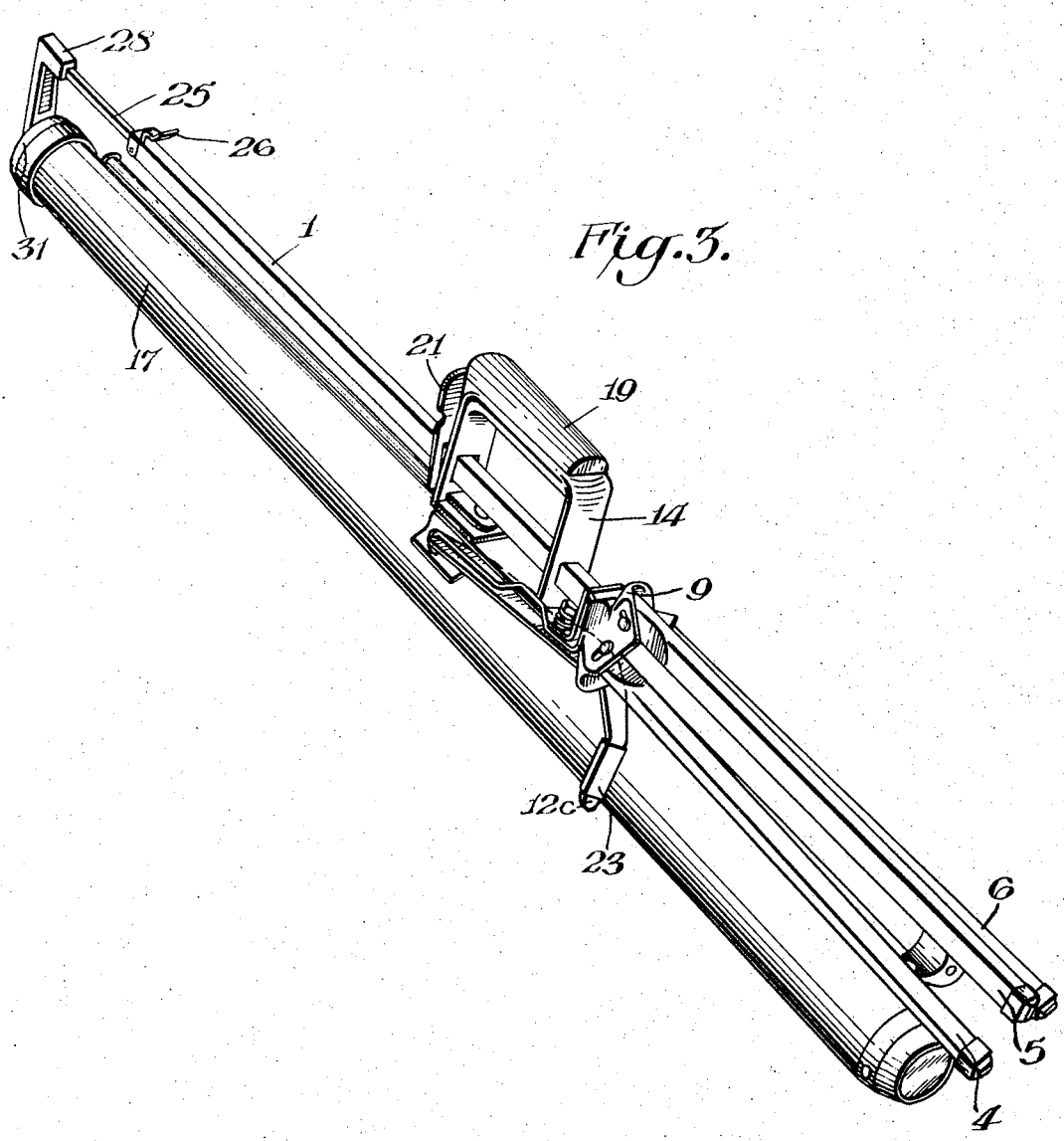

3,365,155
PORTABLE PROJECTION SCREEN ASSEMBLY
Herman Müller, Munich, Germany, assignor to Agfa-Gevaert Aktiengesellschaft, Leverkusen, Germany
Filed Dec. 23, 1965, Ser. No. 515,961
Claims priority, application Germany, Jan. 13, 1965, A 48,100
8 Claims. (Cl. 248—171)

ABSTRACT OF THE DISCLOSURE

A portable projection screen assembly includes a support column having extendable and retractable support legs with a self-winding picture screen in a slotted rotatable protective casing; drive means including a swinging lever urged against the protective casing transmits the swinging movement of the casing to the support legs.

---

This invention relates to a portable projection screen, particularly of the type used with motion picture projectors, slide projectors, and the like.

Conventional portable projection screens include a support column which carries by means of a mechanical device, retractable support legs and a slotted, tube-shaped protective casing for a projection screen. The casing is swingable at about 90° and movable, if necessary, in the direction of the support column. Consequently, in the portable or stored position, the rolled up screen and casing are essentially parallel to the support column.

In the known portable projection screens of this type it is necessary first of all before use to manually pull apart the support legs before the picture screen itself is pulled out and hung by its binding bar on a corresponding mount, e.g., at the top of an extendable extension rod. In one known arrangement the portable picture screen has an extension drive, engaging the roller rod of the projection screen which remains in a position concentric to the support post during the entire extension movement, which is coupled in a form-locking manner with a spreader drive affecting the supporting legs which in turn can be set up and rolled out with one manipulation. In this arrangement, however, the extension drive must have an extension width corresponding to the total width of the projection screen, thus necessarily resulting in considerable cost of construction. Furthermore, the possible maximum width of the screen is limited by the extent of the armspread.

An object of this invention is to provide a portable projection screen which can be set up and taken down in a simple and convenient manner.

In accordance with this invention a drive is provided to transmit the swinging movement of the protective casing to the device for the retracting of the support legs. For example, a swing lever may be annexed to the casing under spring and/or gravitational action in the assembled and/or portable condition of the projection screen.

For the setting up of the projection screen, only the column need then be raised, whereby the protective casing is converted into its working position by the effect of gravity of the support legs and/or of the spring action of the swing lever and whereby the support legs extend simultaneously and automatically. The drive necessary for this is of the simplest kind and its dimensions are not bound or limited by the measurements or dimensions of the screen, which can thus be of almost any desired size. The pulling out and hanging up of the picture screen can take place in a very comfortable and convenient manner with the already standing support. In the disassembly of the projection screen, the support legs are automatically brought back again into their position parallel to the support column merely by turning back the protective casing to its stored or portable condition.

According to a preferred embodiment of the invention, the support legs, arranged radially about the support column, are mounted both on sliding piece, which is movable on the support column, as well as on a stationary spreading member linked to the support column. The sliding piece, in turn, is connected with the swing lever by means of a tension member. This produces a very stable arrangement of the support legs, which furthermore can follow, without special springs, the movement of the protective casing under the sole effect of the force of gravity.

Advantageously, the tension member is made springy in the direction of the pull, for example, by means of a crank or dip formation. It is therefore in the position of equalizing more deviations in tolerance, so that no special care need be expended on the production and adjustment of the inventive device. Even a subsequent addition to the support of the initially named type is possible under certain circumstances.

According to a further characteristic of the invention, the swing lever is mounted on a shim movable on the support column, and the final position of the shim in the pull direction of the tension member is secured by a lug attached to the support column. Further, the protective casing may be movably mounted in a known manner to a sliding handle firmly clamped to the support column, and the shim can be formed as the lug securing the portable setting of the sliding handle. In this manner, the required relative position of the drive members taking part in the retraction of the support legs is achieved very simply, even with subsequent addition of the device if necessary.

A particular advantageous embodiment of the invention is achieved if the support column exhibits an extension rod, which can be pulled out in a known manner and which can be secured in any desired position by means of a hand-activated clamping device. The extension rod may have a tip to serve for hanging up the binding bar of the picture screen. Additionally, the tip may include a stop lug, engageable with the protective casing, in the portable setting of the projection screen, by moving the extension rod in the direction of the force of gravity. In disassembling the projection screen after the swinging back of the casing and pulling in of the support legs, it is necessary only to release the clamp device of the extension rod, generally done by means of a thumb pressure, in order that the tip of the extension rod falls into a position securing the portable position of the projecting screen.

Novel features and advantages of the present invention will become apparent to one skilled in the art from a reading of the following description in conjunction with the accompanying drawings wherein similar reference characters refer to similar parts and in which:

FIG. 1 is a cross-sectional view of the drive for transmitting the swing movement of the protective casing to the device for pulling in the support legs;

FIG. 2 shows the projection screen of this invention in the operating condition; and FIG. 3 shows the portable condition of the projection screen of FIGS. 1–2.

As shown in FIGURE 2, at the lower end of a support column 1 there is attached a bearing 2 at whose bearing points 2a–c spreading braces 6–8 are hinged, being flexibly connected with support legs 3–5. Support legs 3–5 on their part are hinged at a bearing 9, which is movable on support column 1. Legs 3–5 spread out when bearing 9 moves down column 1 by the force of gravity, for example. The spread position can be stabilized by lugs (not shown), attached to the spreading braces or to the bearing.

A U-shaped bearing cap 10 is inserted over the support column 1. As shown in FIG. 1 shaft 11 projects from cap 10 to provide an axis of rotation for swing lever 12. A shank or coil spring 13 is wound around shaft 11 with one leg 13a secured to or against a leg of the U-shaped sliding piece 10. The other end 13b is secured in a boring 11a of shaft 11. Spring 13 urges swing lever 12 in a turning movement in the direction of arrow A according to FIG. 2, and at the same time maintains shaft 11 axially engaged with the swing lever 12.

Furthermore, a box-shaped sliding piece 14 is slipped over the support column 1 and support piece 16 is attached to it by means of rivet 15. Attached to support piece 16 is a protective casing 17 (FIG. 2) for a self-unrolling picture screen 18. Flap 14a of the box-shaped sliding piece 14 protrudes from an arcuate or arcuate quadrant-shaped indentation or slot 16a of the support piece 16, which limits the possible swing movement of the casing 17 to an angle of about 90° as shown in FIG. 2.

The box-shaped sliding piece 14 is provided with a handle 19 and has a friction clamp spring 20 to which an activation key 21 is attached. If handle 19 is manually grasped and the activation key 21 depressed with the thumb to the extent that the edge 20a of clamp spring 20 no longer presses against support column 1, the slide piece 14, with the swingable casing 17 for the picture screen 18 supported thereon, can be moved along the support column 1. By releasing the activation piece 21, casing 17 can be clamped in any desired position. In the portable or stored condition of the projection screen the sliding piece 14 lies against sliding piece 10, which in turn lies against a pin 22 riveted in the support column 1.

Swing lever 12 is connected with bearing 9 of the support legs by means of a tension rod 24 which is hooked in a boring or aperture 12a of one of its ends 12b. The tension rod 24 has a dip or offset 24a which gives this tension rod a certain amount of elasticity in the direction of pull. The swing lever 12 furthermore has on its other end 12c a high-placed flap 12d, which is disposed in the path of swing of casing 17. Flap 12d is covered with an elastic covering 23 to protect the casing 17. Flap 12d is urged against casing 17 under the action of spring 13.

Telescopically disposed in support column 1 is movable supported extension rod 25, which can be clamped in the desired position by means of a clamping device 26, 27. The extension rod 25 has at its upper end a tip 28 which is provided with a groove 28a for receiving a loop 30 which is attached to a binding rod 29 of the picture screen 18. The tip 28 in addition has a cylindrical indentation or groove 28b which (as shown in FIG. 3) can be coupled with or receive a cylindrical addition 31a of end cover 31 of casing 17, as shown in FIG. 2.

The inventive device can be operated as follows:

When being transported or stored, it is in the condition shown in FIG. 3, as already mentioned. For assembly in its operative condition the upper end of the support column is first grasped. The column is then slightly lifted and by pressure on the clamp device 26 the clamping of the extension rod 25 released and the tip 28 disengaged from cover 31. The protective casing 17 swings to its horizontal position by the action of spring 13 engaging swing lever 12 which lies against casing 17. At the same time support legs 3–5, connected with swing lever 12 by tension rod 24, are drawn out or extended. The support is now set up. The projection screen 18 is pulled out of casing 17 by means of the handle loop 30 and is hooked on the support tip 28. According to choice, only one of the clamping devices 21 or 26 can be released and the bottom rim 17 or the top rim 29 of the picture screen 18 brought to the desired position.

In order to take the device down, by releasing the clamping device 21, the support piece 14 of casing 17 is placed against support piece 10 of swing lever 12. Then the support column is again grasped at its upper end and slightly raised. Casing 17 then swings in the arrow direction B until it returns to its portable position parallel to support column 1. Swing lever 12 protruding with its flap 12d in the path of movement of casing 17 is thereby moved opposite arrow direction A and thus pulls in support legs 3–5 by means of connecting rod 24. The stand is set down and the clamping device 26 released. The extension rod 25 glides into support column 1 by the force of gravity thereby pushing indentation 28b of the stand clamping device 21, the support piece 14 of casing 17 is thereby secured in its portable position.

Obviously, many modifications and variations of the present invention are possible in the light of the above teachings. It is, therefore, to be understood that within the scope of the appended claims the invention may be practiced otherwise than as specifically described.

What is claimed is:

1. In a portable projection screen assembly having a support column with extendable and retractable support legs and a slotted rotatable protective casing for housing a self-winding picture screen, said casing being swingable for movement in the direction of the support column whereby in the portable condition of the projection screen the casing is substantially parallel to the support column, characterized in that drive means are provided between said support legs and said protective casing to transmit the swinging movement of said protector casing to said support legs, said drive means including a swinging lever urged against said protective casing and linked to said support legs.

2. In a portable projection screen assembly having a support column with extendable and retractable support legs and a slotted rotatable protective casing for housing a self-winding picture screen, said casing being swingable for movement in the direction of the support column whereby in the portable condition of the projection screen the casing is substantially parallel to the support column, characterized in that drive means are provided between said support legs and said protective casing to transmit the swinging movement of said protector casing to said support legs, said drive means including a swinging lever urged against said protective casing, a sliding piece being movably mounted on said support column, spreading braces being immovably mounted on said support column, said support legs being radially supported by said sliding piece and said spreading braces and a tension rod connecting said sliding piece to said swing lever.

3. A projection screen assembly as set forth in claim 2 wherein said tension rod includes an offset dip to enhance its spring action.

4. A projection screen assembly as set forth in claim 3 wherein a clamp is movably arranged on said support column, and said swing lever being connected to said clamp.

5. A projection screen assembly as set forth in claim 4 wherein a lug is disposed on said support column for limiting the amount of movement of said clamp toward said tension rod.

6. A projection screen assembly as set forth in claim 5 wherein a sliding handle is disposed on said protective casing for manually swinging said casing, and said clamp being a stop member disposed in the path of movement of said handle to limit the movement of said handle when said casing is in its portable condition.

7. A projection screen assembly as set forth in claim 1 wherein spring means biases said lever against said casing.

8. A projection screen assembly as set forth in claim 7 wherein said swing lever includes a substantially straight portion substantially parallel to said support column, a tip portion substantially perpendicular to said straight portion, an angle portion connecting said straight portion and said tip portion, and a protective covering on said tip portion whereby said casing is contacted by said covering.

References Cited

UNITED STATES PATENTS

| | | | |
|---|---|---|---|
| 2,899,164 | 8/1959 | Nicholas et al. | 248—171 |
| 3,161,393 | 12/1964 | Swanson | 248—113 |
| 3,245,644 | 4/1966 | Kozel | 248—171 |

ROY D. FRAZIER, *Primary Examiner.*

J. F. FOSS, *Assistant Examiner.*